(12) United States Patent
Dubois et al.

(10) Patent No.: US 6,917,881 B2
(45) Date of Patent: Jul. 12, 2005

(54) METHOD FOR DETERMINING PRIMARY STATIC CORRECTIONS TO BE APPLIED TO SEISMIC TRACES

(75) Inventors: Jean-Claude Dubois, Lapleau (FR); Patrice Ricarte, Billere (FR); Rodolphe Massu, Billere (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 109 days.

(21) Appl. No.: 10/417,090

(22) Filed: Apr. 17, 2003

(65) Prior Publication Data

US 2004/0015297 A1 Jan. 22, 2004

(30) Foreign Application Priority Data

Apr. 17, 2002 (FR) .............................. 02 04838

(51) Int. Cl.[7] .............................................. G06F 19/00
(52) U.S. Cl. .............................................. 702/14; 703/5
(58) Field of Search ........................... 702/14, 18, 16, 702/17; 367/38, 52, 53; 700/90

(56) References Cited

U.S. PATENT DOCUMENTS

| | | | | |
|---|---|---|---|---|
| 4,839,869 A | * | 6/1989 | Corcoran ...................... | 367/53 |
| 5,197,039 A | * | 3/1993 | Corcoran et al. ............. | 367/52 |
| 5,293,352 A | * | 3/1994 | Chambers .................... | 367/38 |
| 5,508,914 A | * | 4/1996 | Lee ............................... | 702/14 |
| 5,764,514 A | * | 6/1998 | Raynaud et al. .............. | 700/90 |
| 6,188,964 B1 | * | 2/2001 | Reister et al. ................ | 702/17 |
| 6,424,920 B1 | * | 7/2002 | Osypov ........................ | 702/18 |
| 6,501,703 B2 | * | 12/2002 | Zhou et al. ................... | 367/38 |
| 6,757,616 B1 | * | 6/2004 | Emmons et al. ............. | 702/18 |
| 6,799,118 B2 | * | 9/2004 | MacKay ...................... | 702/16 |
| 2003/0074140 A1 | * | 4/2003 | MacKay ...................... | 702/18 |
| 2004/0015297 A1 | * | 1/2004 | Dubois et al. ................ | 702/14 |

FOREIGN PATENT DOCUMENTS

FR   2 798 737   9/2000

\* cited by examiner

Primary Examiner—John Barlow
Assistant Examiner—Victor J. Taylor
(74) Attorney, Agent, or Firm—Antonelli, Terry, Stout & Kraus, LLP

(57) ABSTRACT

A method is disclosed for determining, without carrying out a well-velocity survey or making a priori assumption on the velocity of the first medium, the primary static corrections to be applied to sets of seismic traces after seismic prospecting operations in an underground zone. A velocity model allows calculation of the corrections is essentially obtained by performing, for each position of the common midpoint, a continuous and progressive inversion of the first arrival times (time-distance curves), from short offsets to longer offsets, so as to allow going from a sequence of pairs connecting the offsets to the arrival times picked to a sequence of vertical data connecting the depth to the velocity or propagation of the waves.

2 Claims, 5 Drawing Sheets

$$\sin \theta = V(z) / V(z=h)$$

METHOD FOR DETERMINING PRIMARY STATIC CORRECTIONS TO BE APPLIED TO SEISMIC TRACES

BACKGROUND OF THE INVENTION

FIELD OF THE INVENTION

The present invention relates to a method for calculating the primary static corrections to be applied to sets of seismic traces after seismic prospecting operations in an underground zone, by applying a velocity model of the seismic waves in a formation zone close to the surface (including the weathered zone or WZ).

It is generally the case, that the formations close to the surface are poorly consolidated and weathered, and that their compaction increases with the depth of burial. The velocity of propagation of the seismic waves therefore increases with the depth.

Furthermore, the velocity or propagation varies not only in stages at the interfaces between the various layers successively encountered by the waves, but also increases continuously within each one. It is also assumed that the velocity does not vary laterally as long as the distribution of the source-receiver offsets remains below an interval corresponding to a reasonable offset (typically less than or equal to 2000 m) meeting this 1D hypothesis.

In 1930, Blondeau proposed a method of calculating static corrections from the refraction pick, in the case of a single layer, and he showed that the increase of velocity V with depth Z in superficial media follows a law of the form as follows $$V = kZ^{\frac{1}{n}}, \qquad (1)$$

n tending to 6 for consolidated media.

Gassmann, F. (1951), in "Elastic Waves Through a Packing of Spheres", Geophysics, Vol.16, 673–685, showed that the velocity of propagation of P waves is expressed in power $\frac{1}{6}$ of the depth in consolidated media, attributing this characteristic to a description of the medium considered as a packing of spheres where the interstitial space is minimal for consolidated media (see FIG. 2):

$$V = kZ^{\frac{1}{6}}, \qquad (2)$$

with, $$k = \frac{E^2}{(1-\sigma^2)^2},$$

where E is Young's modulus and $\sigma$ Poisson's ratio for the medium.

Musgrave, A. W. et al. (1967), in, "Practical Application of Blondeau Weathering Solution" taken from "Seismic Refraction Prospecting", Ed. Tulsa, Soc. Expl. Geophys., dealt with the control and the position of the interfaces of a medium having several layers, given by the interpretation of the time-distance curves in refraction shooting, and established curves showing that, in relation (1), constant n is directly related to the compaction rate and ranges from 0 to 6. Value n=6 corresponds to well compacted media.

These authors have provided a methodology for calculating the static corrections to be applied to the traces, based on the mathematical formalism described by Blondeau which allows going from a picked time to the depth of the markers. Interpretation of the slopes of the time-distance curve, plotted in a log—log diagram, allows isolation of each geologic level and the calculation of two quantities F and $\beta$ connected to each other by a mathematical relation.

The method has to be calibrated (in order to initialize calculation) and requires a large part of interpretation for determination of the various levels. Since nothing in the method allows determination of the values of F and P for the first level, the velocity has to be set thereof so as to be able to start calculations from the next level.

The calibration point results from data obtained from well-velocity surveys, a technique that will be discussed hereafter, or from prior knowledge. In any case, relatively precise knowledge is required of the zone studied. In so doing, the time-depth curve obtained from the well-velocity survey can best agree with the curve resulting from calculation.

The measuring technique known as velocity survey or well-velocity survey allows estimation of the variation of the propagation velocity in the first rocks of a formation. This technique consists in measuring the times of vertical propagation of the waves successively emitted, between a seismic source triggered at points located at various depths of a borehole and a surface seismic receiver. It allows obtaining, on the drilling site, a (time-depth) curve of the formation portion drilled and consequently to give a calibration point for calculation of the static corrections, except for measuring errors.

For economic reasons, there often are not enough well-velocity surveys, which in addition are not deep enough. The weathered zone (WZ) thus has only a very small number of calibration points, so much so that it is not unusual in practice to have only one well-velocity survey for several seismic profiles. Furthermore, it will not be entirely determined if the survey does not reach the first compacted rocks. The calibration point will be of poor quality or at least contain a measuring bias.

SUMMARY OF THE INVENTION

The method according to the invention allows determination of the primary static corrections to be applied to sets of seismic traces resulting from seismic prospecting operations in an underground zone, obtained according to the multiple coverage technique and arranged in common midpoint collections.

In accordance with the invention a model representative of the velocities of propagation of the seismic waves in a formation zone relatively close to the surface is directly determined by carrying out, for each position of the common midpoint, a continuous and progressive inversion of the first arrival times, from short offsets to longer offsets, so as to be able to go from a sequence of pairs connecting the offsets to the arrival times picked for a sequence of vertical data connecting the depth to the velocity of propagation of the waves, and the velocity model obtained is applied to the sets of seismic traces.

The first seismic arrivals used can be obtained from any 2D or 3D seismic traces collection (whether corresponding to a common shotpoint or to a common receiver, a common midpoint, a common offset, etc.) and the picking of the arrivals can be manual or automatic.

According to a preferred embodiment, the method comprises, for each given common midpoint collection, an iterative process involving a number r of levels of the velocity model (corresponding each to a pair of picked time and collection offset values as explained in the description hereafter) and comprising A) an initialization stage involving a first level and a second level of the model wherein:
   a) for the second level, the value of a ratio ($\beta$) between the mean velocity and the velocity in the interval between the two levels is determined and the value, for the second level, of a function (F) depending on the value of the ratio is deduced therefrom,
   b) the value of function (F) is calculated for the first level by inversion thereof,
   c) the depth and the vertical propagation time are determined for the first level, and
   d) the depth of the second level is calculated;

B) a stage wherein ratio $\beta$ and the value of function (F) are successively calculated for each one of the (r-2) levels of higher order so as to deduce therefrom the vertical time and the depth of each corresponding level of the model and a velocity is deduced therefrom, C) reiteration of stages A) and B) for each collection so as to determine the vertical propagation time and the depth of each corresponding level of the model and to deduce therefrom the corresponding velocities, and D) calculation of the static corrections to be applied to the sets of seismic traces.

The method according to the invention allows correct carrying out the initial calibration of the first level without requiring (costly) well-velocity surveys or a priori knowledge. It also allows automation of all of the actions which so far were manual and interpretative (slopes exploitation). Furthermore, the method is applied to 2D or 3D seismic data.

BRIEF DESCRIPTION OF THE DRAWINGS

Other features and advantages of the method according to the invention will be clear from reading the description hereafter of an embodiment given by way of non limitative example, with reference to the accompanying drawings wherein.

DETAILED DESCRIPTION OF THE PREFERRED EMBODIMENT

The seismic data to which the method of the invention is applied are sets of traces obtained in the field according to the conventional technique allowing coverage (CMP).

The conventional data conditioning operations before applying the method according to the invention to the seismic traces comprise for example:

picking the first arrivals and obtaining an ASCII file in which each pick is referenced with geographic data for the seismic source and the receiver, editing the pick, quality control: checking the geometry, the altimetry, etc., arranging the traces referred to as upstream traces (traces before the shotpoint) and the traces referred to as downstream traces (traces behind the shotpoint) in common midpoint (CMP) collections and in different files, so as to bring to the same point all the ($T_{ij}$,$X_{ij}$) pairs and thus to better stabilize the total refraction point at the vertical of this location. It can be noted that this separation between upstream and downstream traces is not mandatory but only recommended. It affords the significant advantage of allowing control of the acquisition geometry, application of different thresholds:
a) according to the degree of coverage, the CMP collections whose degree is below three, i.e. having less than three ($T_{ij}$,$X_{ij}$) pairs, are not processed,
b) on the minimum and maximum offsets, which are given by the user,
c) with rejection of the offsets of a pair N that would be less than the offsets of pair (N-1),
d) with the same rejection as in c) which is carried out for the picked times.

Figure 3B:
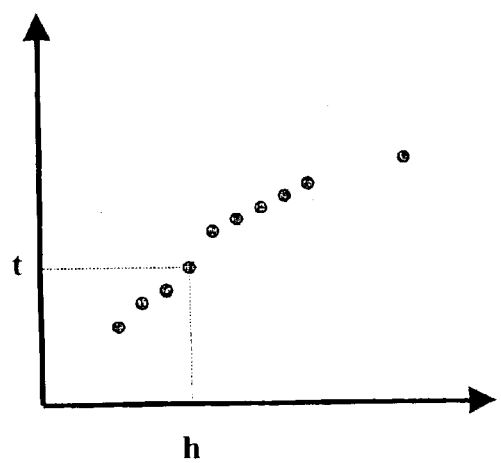
Figure 3A:
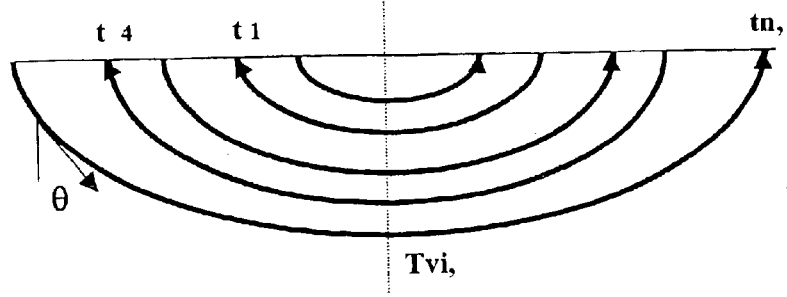
Figure 4:
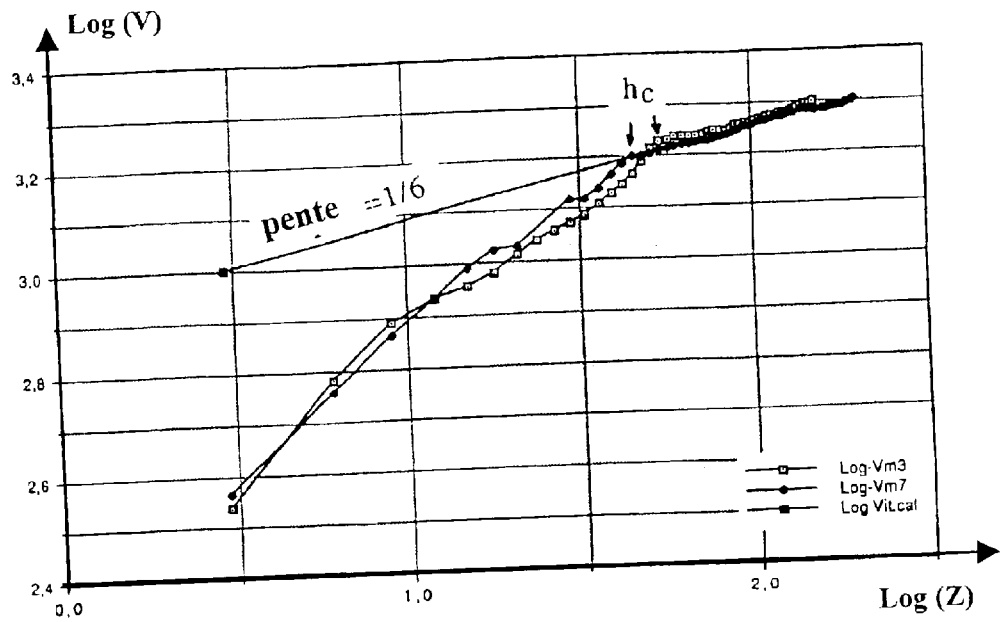
FIG. 4 shows the result of the inversion in form of velocity-depth pairs in a log—log representation.

These prior operations being carried out on the trace sets, the specific "pseudo-well-velocity survey" method according to the invention is applied, which is essentially a continuous and progressive inversion of the first arrival times, that is the refracted waves, from short offsets to longer offsets, so as to be able to go from a sequence of offset/picked arrival time pairs (FIG. 3) to a sequence of vertical depth/velocity data (FIG. 4). By carrying out this inversion, a "pseudo-well-velocity survey" is calculated for each position of the common midpoint. In the end, without having to perform a well-velocity survey, a velocity model characteristic of the superficial rocks is delivered and, from this "geologic" model of the weathered layers, it is possible to calculate primary static corrections. The operations for implementing the method can be readily automated under UNIX or LINUX for example) and rapidly executed.

A model representative of the variation of the propagation velocities in the first rocks of the underground formation is determined by means of seismic traces conventionally formed during a succession of exploration cycles comprising application in or on the ground by means of a triggered source S (referred to as shot hereafter), generating seismic waves, recording the wavetrain reflected by the underground formation discontinuities in response to the seismic waves transmitted, picked up by a set of seismic receivers R coupled with the formation, and combination of the sets of seismic traces obtained (multiple coverage technique or CDP).

Figure 1A:
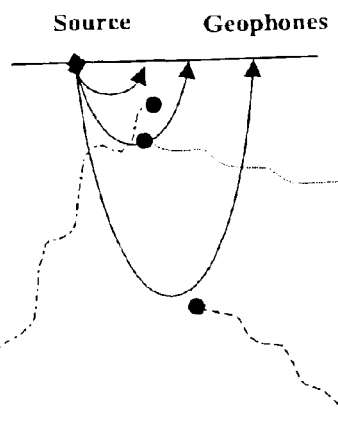
FIGS. 1A, $1B_1$, $1B_2$, $1B_3$ diagrammatically show refracted raypaths between a source point and various receivers (FIG. 1A) and how these rays are organized in CMP (FIGS. $1B_1$, $1B_2$, $1B_3$)
Figure 1A:
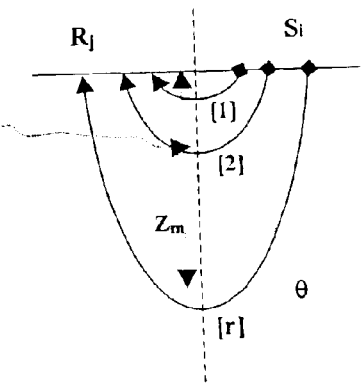
Figure 1A:
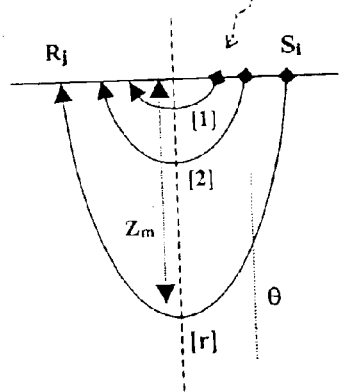
Figure 1A:
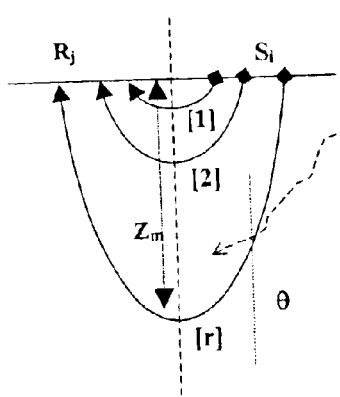
Figure 1C:
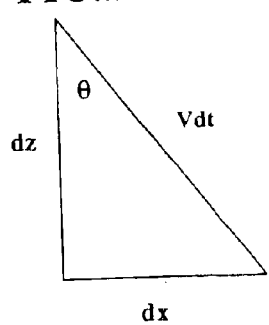
FIG. 1c is a zoom view at a given depth Z of the angle of emergence showing the relation between the local slope of the angle and the depth.
Figure 2:
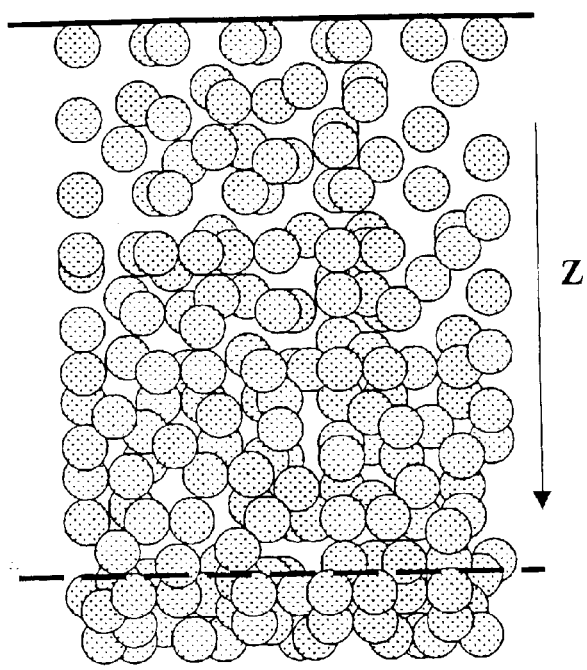
FIG. 2 illustrates the way the formation compaction is modelled by a variation as a function of the depth of the spheres density, FIGS. 3A and 3B, for a given CMP, show the refracted raypaths (FIG. 3A) and the distribution of the picked first arrival times as a function of the distance h of the seismic shot (FIG. 3B)

The initial data reorganization stages are illustrated by FIGS. 1A–1C.

The starting point is the data acquired at the shotpoint (FIG. 1A) so as to form, for each one, a set of pairs (picked time, $T_{ij}$/source-receiver distance, $X_{ij}$). Each one of these pairs, from the same shotpoint, does not belong to the same CMP collection. Before initializing the calculations, all of the ($T_{ij}$,$X_{ij}$) pairs therefore have to be reorganized into CMP collections (FIGS. $1B_1$, $1B_2$, $1B_3$). Thus, in the example, the first pair associated with the shotpoint (FIG. 1A) becomes the first pair of the $CMP_p$ collection (FIG. $1B_2$), the second pair associated with the shotpoint becomes the second pair of the $CMP_q$ collection (FIG. $1B_3$), etc.

Once this essential preliminary stage has been carried out, the well-velocity survey calculation proper can start.

The mathematical procedure used for implementing the method is first described hereafter.

The velocity in the media is considered to vary according to relation (1). Let $X_{ij}$ be the distance between source i and receiver j, then if replacement occurs in the expression of the sine of the critical angle θ (Snell-Descartes formula) of the velocity by relation (1), depth Z at any point of the ray is expressed by the relation:

$$Z = Z_m \cdot \sin^n \theta \quad (3),$$

where $Z_m$ is the maximum penetration of the ray, and θ the angle between the vertical and the ray at depth Z.

Differentiation of relation (3) and replacement, in this relation, of dx by (tanθdZ) (FIG. 1c), then $Z_m$ is expressed as a function of $X_{ij}$ such that:

$$Z_m = X_{ij}/F \quad (4),$$

with $$F = 2n \int_{\theta=0}^{\pi/2} \sin^n \theta \, d\theta. \quad (5)$$

It may be shown that a substantially equivalent expression for the previous integral is:

$$F = 2 \frac{1 + 0.2\beta}{(1-\beta)^{0.51}}. \quad (5a)$$

Similarly, the traveltime (FIG. 1c) is written as follows:

$$dt = dZ/V\cos\theta \quad (6).$$

Thus, if integration of relation (6) occurs:

$$t_v = \int \frac{dZ}{V},$$

By substitution of the velocity for expression (1) and $Z_m$ for relation (4), the relation as follows is obtained:

$$\frac{dX}{dT} = \frac{X_{ij}}{\beta T_{ij}}, \quad (7)$$

from which β is expressed and $t_v$ is deduced, as follows:

$$t_v = \frac{T_{ij}}{F}. \quad (8)$$

For each trace, the initial data are:
$T_{ij}$ (picked time between shot i and trace j),
$X_{ij}$ (distance between source i and receiver j).

For each midpoint position, the application itends to define, for all of the ($T_{ij}$,$X_{ij}$) pairs picked:
$V_{int}$ or $V_m$, the interval or mean velocity of the medium,
Z, the depth of the interface.

Parameter β thus appears as the ratio between the mean velocity $$\frac{X_{ij}}{T_{ij}} \text{ and the interval velocity } \frac{dX}{dt}.$$

Figure 5:
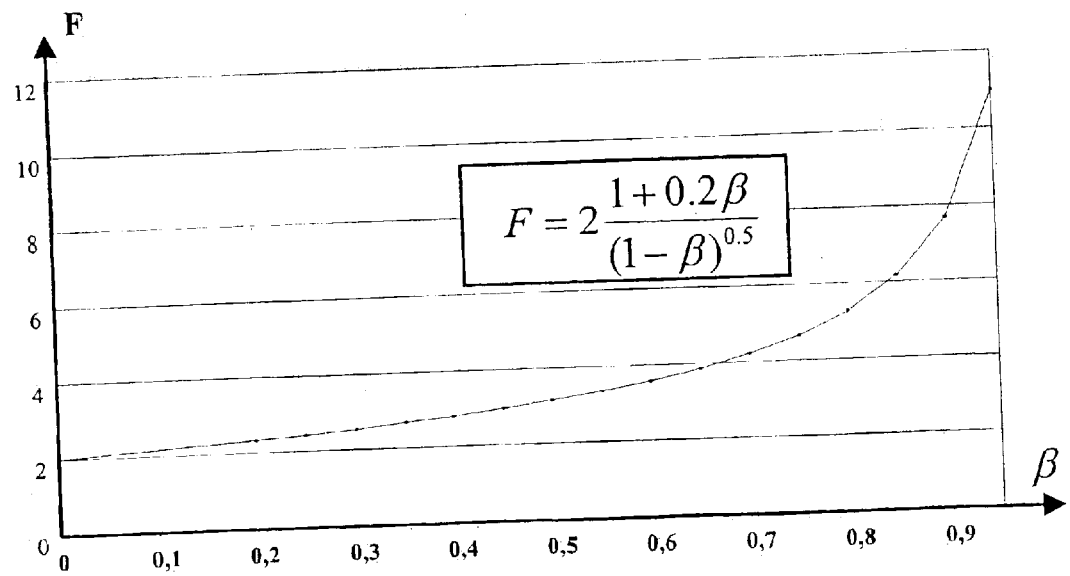
FIG. 5 shows the curve of function F as a function of $\beta$, whose validity range is between 0.2<$\beta$<0.98 (Musgrave et al.), FIG. 6 allows to compare, for the same position, the measurements of a well-velocity survey (triangle) with the result obtained by the method (square)

Relation (1) is used to determine the velocity and the curve established by Musgrave et al. (such as the curve of FIG. 5) giving the variation of F as a function of β.

The calculation process essentially consists, for each given "pseudo-well-velocity survey" (or, in other words, for each CMP collection processed), and for each (picked time/offset) pair, starting from the short offsets up to the longer offsets selected, in obtaining a new pair: velocity and depth.

The process being iterative, a velocity model is obtained with as many "layers" or "levels" as there are (picked time/offset) pairs to be processed in the CMP collection.

Thus, for all of the midpoint collections ( . . . , $CMP_n$, . . . $CMP_p$ . . . , $CMP_q$, . . . ), the calculation algorithm (illustrated in FIG. 1) is as follows:

A) In an initialization stage involving the first two levels of the model level [1] and level [2],
   a) the value of function β is determined for level [2], for the second picked time/offset pair of the CMP collection (application of relation (7)),
   b) by means of the approximate expression of function F, the value of F is deduced for this level [2],
   c) function F is inverted (see curve FIG. 5) in order to determine the value of F for level [1],
   d) depth $Z_1$ (=$X_1/F_1$) and vertical time $t_v$ (=$T_1/F_1$) are determined for level [1], and
   e) depth $Z_2$ of the second level ($Z_2-Z_1$=($X_2-X_1$)/$F_2$) is calculated by applying relation (4);

B) In a second stage, calculation is iterated for all the levels of higher order (level [3] . . . [r]) in order to determine β and F for each level or pair and the vertical time and the depth of each layer are determined by applying relations (8) and (4) from which the corresponding velocities are deduced;

C) Stages A and B are repeated for each CMP collection so as to determine the corresponding velocities, and D) The static corrections to be applied to the static seismic traces are calculated.

The velocities are thereafter preferably smoothed.

Figure 6:
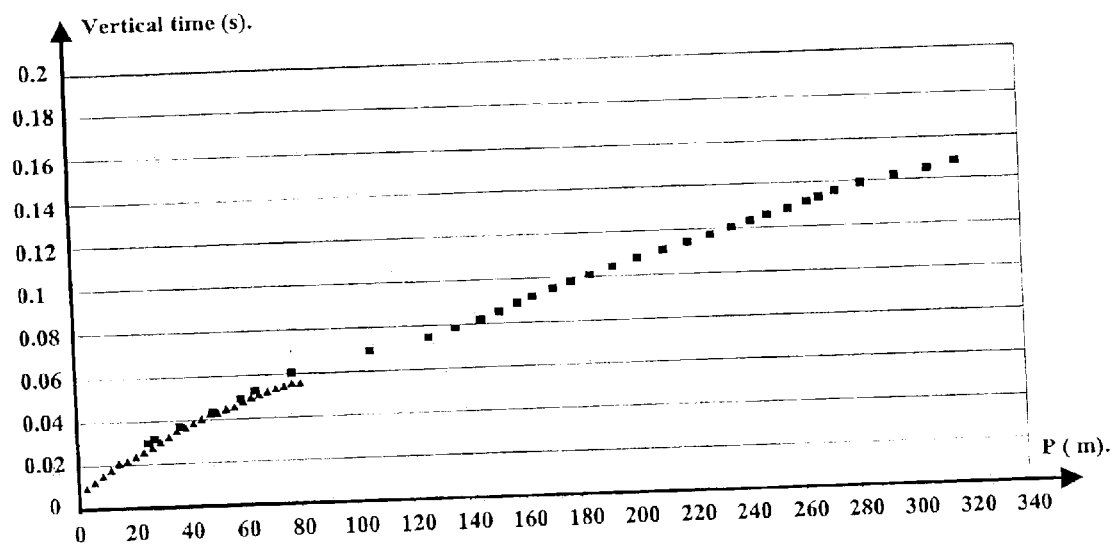
Figure 7:
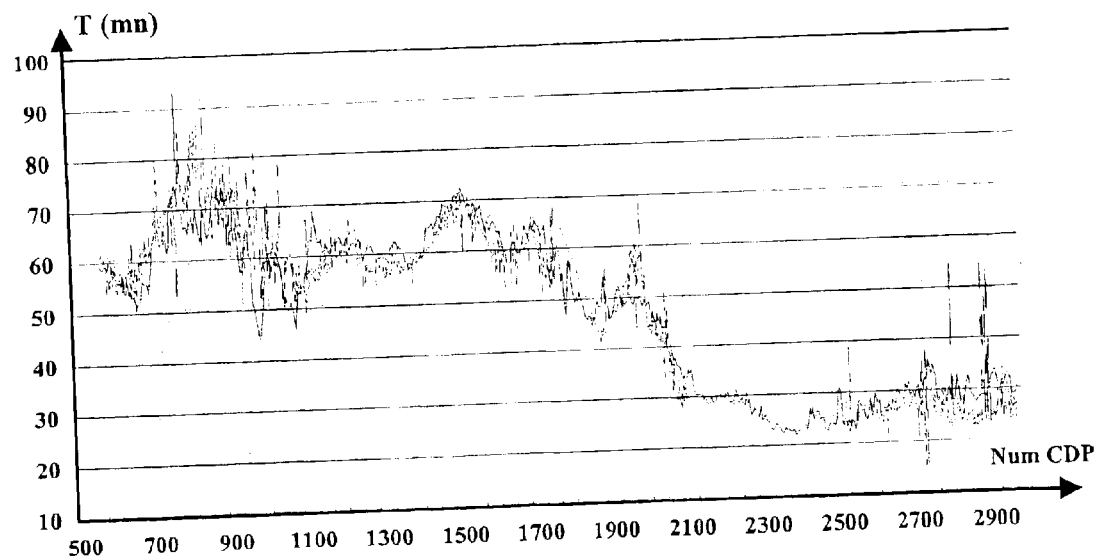
FIG. 7 shows the static correction curve obtained by the method (dashed which can be directly compared with the curve obtained by means of a proven tool working from the method known as delay method to specialists, such as the Green Mountain Geophysics "Fathom" tool (solid curve), FIG. 8 shows the velocity model obtained by applying the method, and FIG. 9 illustrates, by way of example, the map of the static corrections obtained for a 3D seismic survey.

FIG. 6 shows a comparison between the measurements of a well-velocity survey (triangles) and the results obtained with the method (squares).

The high density of points at the start of the curve for the well-velocity survey (measured every 3 m), which agrees with the pseudo-well-velocity survey results, can be noted. The much greater depth of investigation allowed by the pseudo-well-velocity survey can also be underlined. To obtain such deep measurements with a well-velocity survey, the drilling depth should have been doubled or tripled, which is economically unrealistic.

Figure 8:
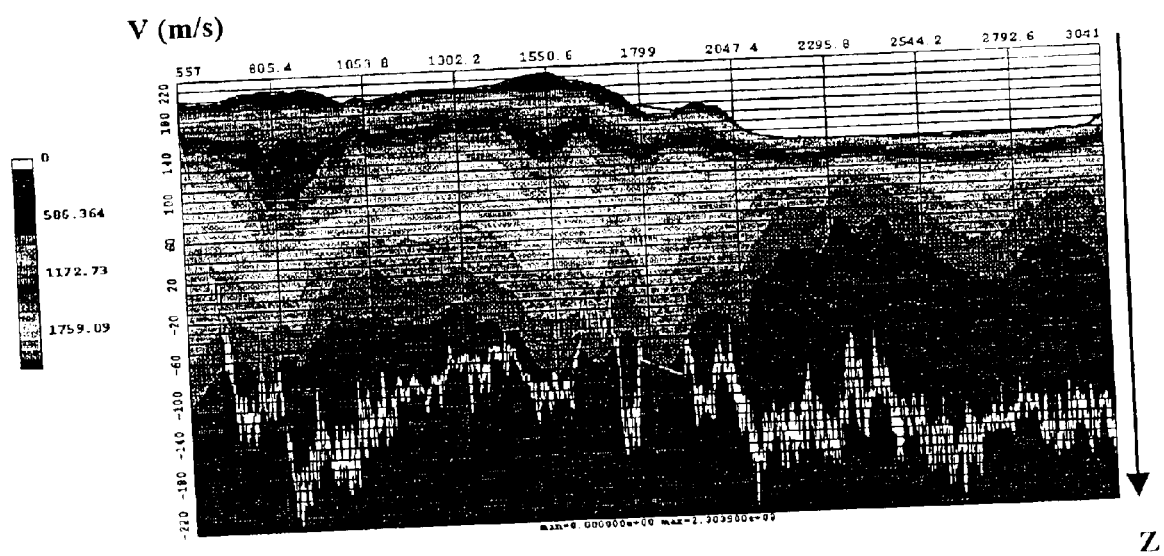
Figure 9:
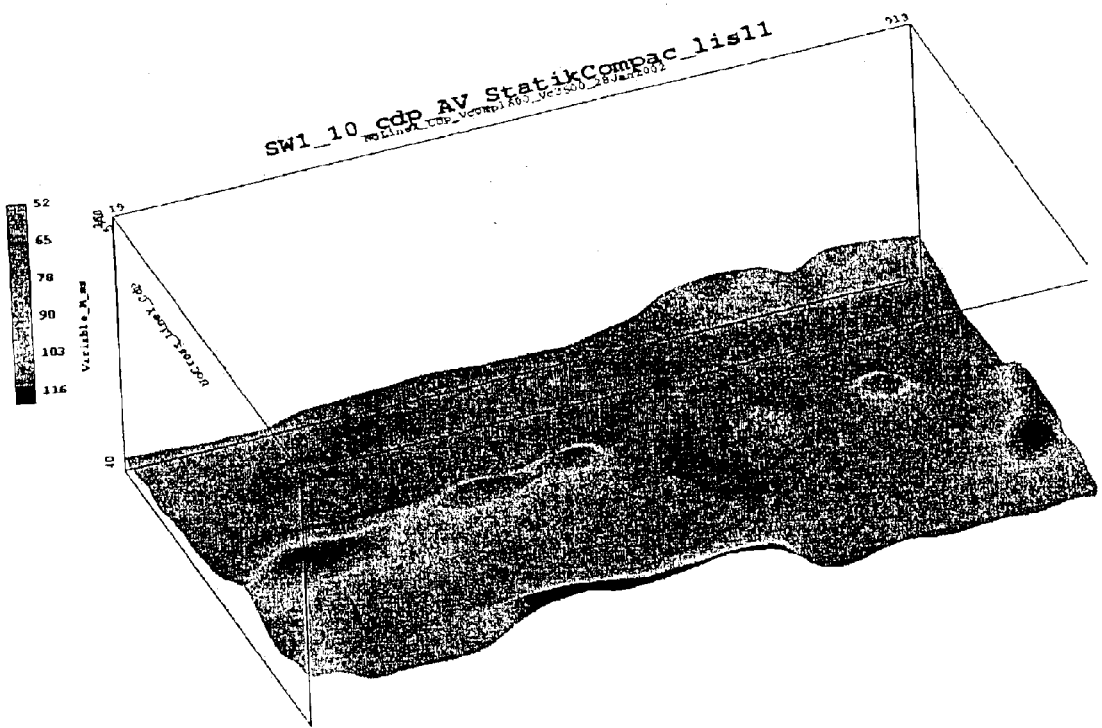

FIG. 8 shows a velocity model obtained by means of the method on Paris Basin data. The vertical dimension is the depth expressed in meters (starting from the real altimetry, black curve at the top), the horizontal dimension represents the seismic profile expressed in common midpoint position CMP. In the present case, with 5 m between two CMPs, the profile is approximately 12 km long.

The different velocities are coded with different shades of grey from 500 m/s to 2100 m/s. The black line at the bottom of the drawing represents the entry in the compacted grounds, that can be very clearly located and by an objective criterion by applying the method. The white line (below) determines the penetration limit (last calculated value that is directly a function of the maximum offset used); below this line, the results shown are an extrapolation of the last value found.

It may be emphasized that the sampling of a "pseudo-well-velocity survey" is clearly looser than that of a well-velocity survey carried out in the field without altering the results of the former. In fact, for the former, the measuring points are obtained from a seismic survey, thus conventionally with a 25-m spatial sampling, whereas for the latter the vertical time is measured every 3 m or 5 m in depth. Despite this significant constraint, the results obtained by means of a "pseudo-well-velocity survey" are remarkably similar to the results obtained by means of a well-velocity survey (see FIG. 6).

What is claimed is:

1. A method for determining primary static corrections to be applied to sets of seismic traces resulting from seismic prospecting operations in an underground zone, combined according to a multiple coverage technique and arranged in common midpoint collections with arrival times being picked, comprising directly determining a velocity model representative of velocity of propagation of seismic waves in a formation zone proximate to ground surface of the underground zone by carrying out, for each position of common midpoint collections, a continuous and progressive inversion of first arrival times, from shorter offsets to longer offsets, by considering that the velocity of propagation varies continuously as a fractional power of the depth, to enable going from a sequence of pairs connecting the offsets to arrival times picked for a sequence of vertical data connecting depth to the velocity of propagation of the seismic waves, and applying the velocity model to the sets of seismic traces.

2. A method as claimed in claim 1, wherein for each common midpoint collection, an iterative process involving a number of r levels of the velocity model comprising:

A) an initialization involving a first level and a second level of the model wherein:
  a) for the second level, a value of a ratio between a mean velocity and a velocity in the interval between two levels is determined and a value, for the second level, of a function depending on the value of said ratio is deduced therefrom,
  b) the value of the function is calculated for the first level by inversion thereof,
  c) depth and vertical propagation time are determined for the first level, and
  d) the depth of the second level is calculated:

B) the ratio and a value of the function are successively calculated for each one of the (r-2) levels of higher order so as to deduce therefrom the vertical propagation time and the depth of each corresponding level of the model and a velocity of propagation is deduced therefrom;

C) repeating A) and B) for each collection so as to determine the vertical propagation time and the depth of each corresponding level of the model and to deduce therefrom corresponding velocities; and D) calculation of static corrections to be applied to the sets of seismic traces.

* * * * *